(12) United States Patent
Christianson

(10) Patent No.: US 9,673,606 B2
(45) Date of Patent: Jun. 6, 2017

(54) PRESSURIZED ELECTROMECHANICAL CABLE

(71) Applicant: FLEX-CABLE, Howard City, MI (US)

(72) Inventor: Jan Christianson, Howard City, MI (US)

(73) Assignee: FLEX-CABLE, Howard City, MI (US)

( * ) Notice: Subject to any disclaimer, the term of this patent is extended or adjusted under 35 U.S.C. 154(b) by 38 days.

(21) Appl. No.: 13/919,239

(22) Filed: Jun. 17, 2013

(65) Prior Publication Data

US 2014/0367135 A1  Dec. 18, 2014

(51) Int. Cl.
  *H02G 15/22* (2006.01)
  *H02G 1/14* (2006.01)
  *H02G 3/03* (2006.01)

(52) U.S. Cl.
  CPC .......... *H02G 15/22* (2013.01); *H02G 3/03* (2013.01); *Y10T 29/49117* (2015.01)

(58) Field of Classification Search
  CPC .............................. H02G 15/22; H02G 1/14
  USPC ............................................. 174/19; 310/58
  See application file for complete search history.

(56) References Cited

U.S. PATENT DOCUMENTS

| | | | | |
|---|---|---|---|---|
| 2,548,614 A | * | 4/1951 | Peters | H02K 1/32 105/59 |
| 2,742,582 A | * | 4/1956 | Bahn et al. | 310/52 |
| 2,776,385 A | * | 1/1957 | Modrey | 310/71 |
| 4,609,239 A | * | 9/1986 | Abel | F16L 25/01 439/194 |
| 5,082,410 A | | 1/1992 | Provence | |
| 5,086,901 A | | 2/1992 | Petronis et al. | |
| 5,592,038 A | * | 1/1997 | Gaspar et al. | 310/71 |
| 5,722,876 A | | 3/1998 | Mori et al. | |
| 6,167,900 B1 | | 1/2001 | Laird | |
| 6,489,554 B1 | * | 12/2002 | Bertini et al. | 174/15.6 |
| 6,845,965 B2 | | 1/2005 | Lanting et al. | |

(Continued)

FOREIGN PATENT DOCUMENTS

| | | |
|---|---|---|
| CN | 2937704 | 8/2007 |
| DE | 202005013027 | 12/2006 |
| EP | 2393680 | 12/2011 |

*Primary Examiner* — William H Mayo, III
*Assistant Examiner* — Hiram E Gonzalez
(74) *Attorney, Agent, or Firm* — Avery N. Goldstein; Blue Filament Law PLLC

(57) ABSTRACT

An inventive pressurized cable is provided that simultaneously provides electrical connections and a supply of air, gas, or vacuum to an electromechanical device utilizing an existing connection on the device. The use of an existing cable connection for the supply of air or gas to provide positive pressure or a vacuum condition to an electromechanical enclosure allows for the use of standard electromechanical components without alteration and potential voiding of existing warranties. The present invention finds particular utility in the field of industrial automation where motors are subjected to coolant liquids and other types of contaminants that tend to infiltrate the motor seals, especially when the motor is shut down which causes a negative pressure inside the motor case that draws moisture in. Reactive gasses may be introduced with the inventive positive pressure cable that act to neutralize or condition harmful pollutants generated by the motor such as ozone.

20 Claims, 5 Drawing Sheets

(56) References Cited

U.S. PATENT DOCUMENTS

2008/0296986 A1* 12/2008 Kozaki et al. .................. 310/58
2011/0278291 A1   11/2011 Taylor et al.

* cited by examiner

PRESSURIZED ELECTROMECHANICAL CABLE

CROSS-REFERENCE TO RELATED APPLICATION

This application claims priority of U.S. Provisional Application Ser. No. 61/660,197 filed Jun. 15, 2012, which is incorporated herein by reference.

FIELD OF THE INVENTION

The present invention in general relates to electromechanical cables and connectors and in particular to a dry cable solution that provides a positive pressure gas or air supply or a negative (vacuum) pressure to motorized devices, utilizing existing cabling connections, to prevent ingress or egress of sources of moisture and other contaminants.

BACKGROUND OF THE INVENTION

Electromechanical devices such as motors are employed in many types of applications and processes that subject the electromechanical devices to external sources of moisture and other contaminants. While these electromechanical devices may be designed with seals to attempt to prevent moisture and contaminants from corroding or damaging the internal workings of these devices, the seals may not always be effective. Applications where electromechanical devices operate in humid conditions or fully submerged in fluids often have seals that eventually fail due to the constant inward pressures of the surrounding fluids or simply through open vent apertures. For example, in manufacturing, servo motors are used to actuate deep drawing dies that are flooded with coolant to aid in the deep drawing process. Unfortunately, the motors are also subjected to the coolant during the stamping process, and as a result the motor service life is greatly reduced, and in some instances motors have to be replaced in as little as two to three weeks. It has been determined that such motors often short internally due to coolant ingress, and although the motors are equipped with shaft seal kits, the cooling that occurs when the motor is shut down causes a reduced pressure inside the motor case which draws moisture into the case In order to alleviate the negative pressure that tends to draw in fluids, an air fitting may be installed via a drilled hole in the motors outer casing to allow positive pressure to be applied to the interior of the motor. However, the customization required by drilling holes into standard motor casings is labor intensive, costly, and time consuming, and more importantly tends to void the manufacturer's warranty for the motor.

Furthermore, in certain applications, such as in sterile or clean rooms contaminants and debris exiting from operating motor and motor bearings need to be avoided.

Thus, there exists a need for introducing positive or negative air pressure to electromechanical devices that are subject to external sources of moisture and other contaminants or from keeping electromechanical devices from introducing contaminants to their environment exclusive of costly reworks that are time consuming and void existing device manufacturer warranties.

SUMMARY OF THE INVENTION

An inventive pressurized cable is provided that simultaneously provides electrical connections and a supply of air, gas, or vacuum to an electromechanical device utilizing an existing connection on the device. The use of an existing cable connection for the supply of air or gas to provide positive pressure or a vacuum condition to an electromechanical enclosure allows for the use of standard electromechanical components without alteration. Alterations, typically require additional costs and labor, and may potentially void manufacturer warranties. The present invention finds particular utility in the field of industrial automation where motors are subjected to coolant liquids and other types of contaminants that tend to infiltrate the motor seals, especially when the motor is shut down which causes a negative pressure inside the motor case that draws moisture in. In addition to the benefit of providing positive pressure to keep moisture out of motor casings, reactive gasses may be introduce with the inventive positive pressure cable that act to neutralize or condition harmful pollutants generated by the motor such as ozone. Embodiments of the invention may be used in a sterile or clean room environment, where the introduction of a slight vacuum or negative pressure to an electromechanical assembly or motor, with the inventive pressurized cable assembly, helps to keep contaminants such as fumes, oils, or shavings for emerging from the electromechanical assembly or bearings. In a further embodiment, the introduction of an air stream to an electromechanical device may be used to disperse heat generated by operating elements in the enclosure of electromechanical device.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention.

DESCRIPTION OF THE INVENTION

The present invention has utility as a pressurized cable that simultaneously provides electrical connections and a supply of air, gas, or vacuum to an electromechanical device utilizing an existing connection on the device. The use of an existing cable connection for the supply of air or gas to provide positive pressure or a vacuum condition to an electromechanical enclosure allows for the use of standard electromechanical components without alteration. Alterations, typically require additional costs and labor, and may potentially void manufacturer warranties. The present invention finds particular utility in the field of industrial automation where motors are subjected to coolant liquids and other types of contaminants that tend to infiltrate the motor seals, especially when the motor is shut down which causes a negative pressure inside the motor case that draws moisture in. In addition to the benefit of providing positive pressure to keep moisture out of motor casings, reactive gasses may be introduce with the inventive positive pressure cable that act to neutralize or condition harmful pollutants generated by the motor such as ozone. Embodiments of the invention may be used in a sterile or clean room environment, where the introduction of a slight vacuum or negative pressure to an electromechanical assembly or motor, with the inventive pressurized cable assembly, helps to keep contaminants such as fumes, oils, or shavings for emerging from the electromechanical assembly or bearings. In a further embodiment, the introduction of an air stream to an electromechanical device may be used to disperse heat generated by operating elements in the enclosure of electromechanical device.

Figure 1:
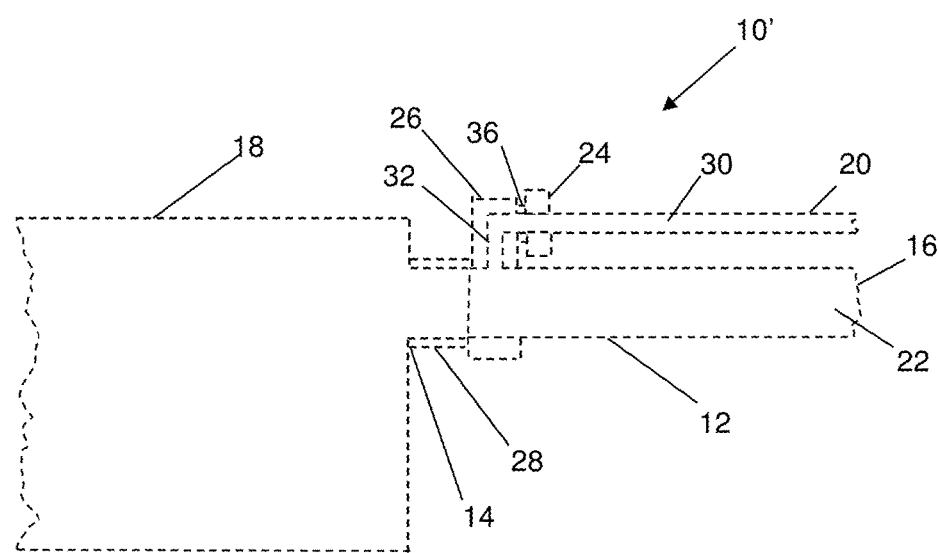
FIG. 1 illustrates a sectioned diagram of an embodiment of the pressurized cable.

With reference to the attached figures, an inventive pressurized cable assembly is depicted generally at 10' in FIG. 1. The cable assembly 10' includes a supply line cable 12 having a first end 14 and a second end 16. Supply line cable 12 has a tubular or hollow area 22 that accommodates wires or other conductors (not shown) for supplying electromechanical device 18. The supply line cable 12 is readily formed of conventional materials including rubber, plastics, woven materials, and combinations thereof. The supply line cable 12 may act as an electrical shield for the enclosed wires and conductors. Optionally, the supply line cable 12 has a circular cross-section; however other cross-sectional shapes, including but not limited to rectangular, square, and oval may be used for the cross-section. The length of the supply line 12 is dependent on the application and distance between the signal or power source (not shown) and the electromechanical device 18.

Proximal to the first end 14 a connector 28 is used to couple supply line 12 to the electromechanical device 18. Connector 28 may be a screw on, snap, or press fit type connector. Proximal to connector 28 a collar 26 couples a pressurized line 20 to supply line cable 12. The pressurized line 20 may either act to introduce a positive pressure with air or gas or a vacuum depending on the application. In an alternative embodiment, the collar 26 may not be positioned near the connector 28, but at another position along the supply line cable 12. The collar 26 may be made of a metal or alloy, plastic, or other composite materials. Collar 26 or overmolding has a channel 32 that couples to positive pressure line 20 with fitting (tube retaining nut) 24 and air fitting gasket 36. Pressurized line 20 has a hollow area 30 that carries dry air or various gases including nitrogen, which are introduced into the supply line cable 12 for carriage into the case of the electromechanical device 18 for creating a positive pressure, or for suctioning air from the electromechanical device to create a vacuum. Supply line cable 12 has a clearance or cavity to allow wires and conductors as well as dry air or various gases to pass through. Optionally, the pressurized line 20 has a circular cross-section; however other cross-sectional shapes, including but not limited to rectangular, square, and oval may be used for the cross-section. Pressurized line 20 may be made of rubber, plastic, or other materials, and may be clear or opaque. The length of the pressurized line 20 is dependent on the application and distance between the air or gas source (not shown) and the electromechanical device 18.

Figure 2:
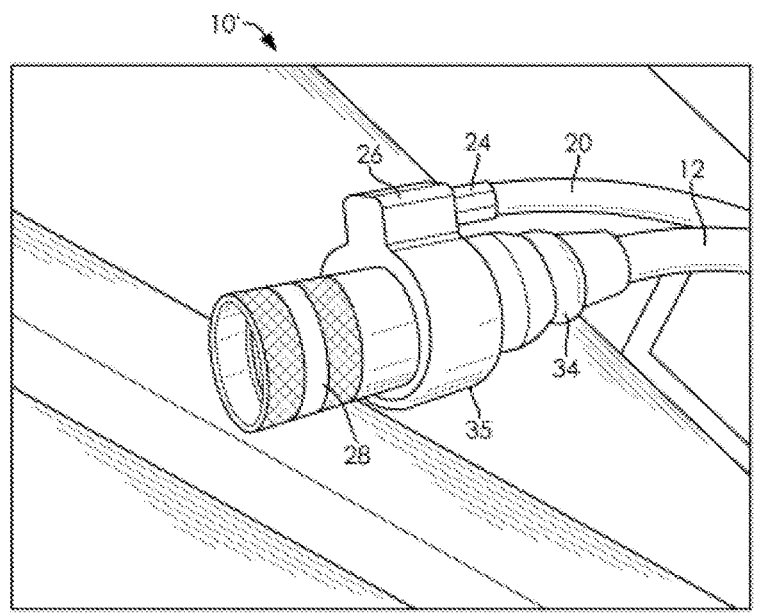
FIG. 2 illustrates a perspective view of an embodiment of the inventive pressurized cable.
Figure 3:
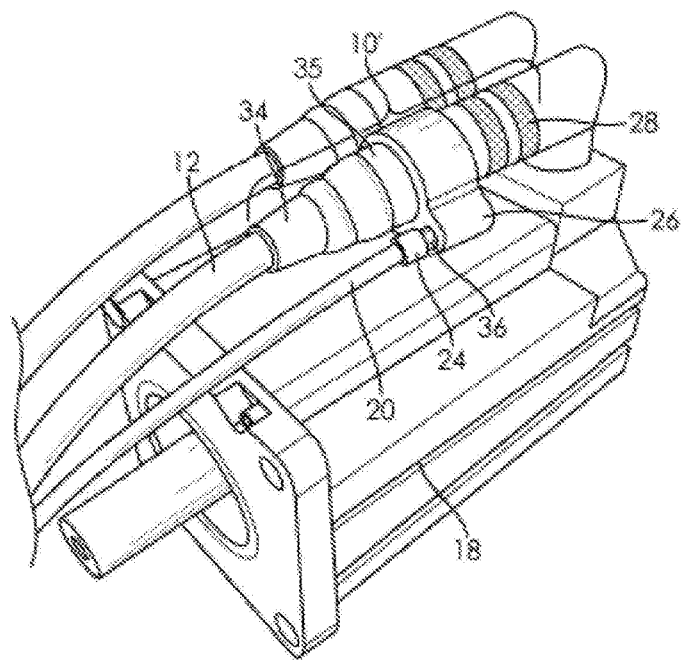
FIG. 3 illustrates a perspective view of the embodiment of the inventive pressurized cable of FIG. 2 connected to a electromechanical device.

FIG. 2 illustrates a perspective view of an embodiment of an inventive pressurized cable assembly 10' with the collar 26 integrated or joined to connector 28 with cable strain relief region 34. FIG. 3 illustrates a perspective view of the embodiment of the inventive pressurized cable 10' of FIG. 2 connected to an electromechanical device 18.

Figure 4:
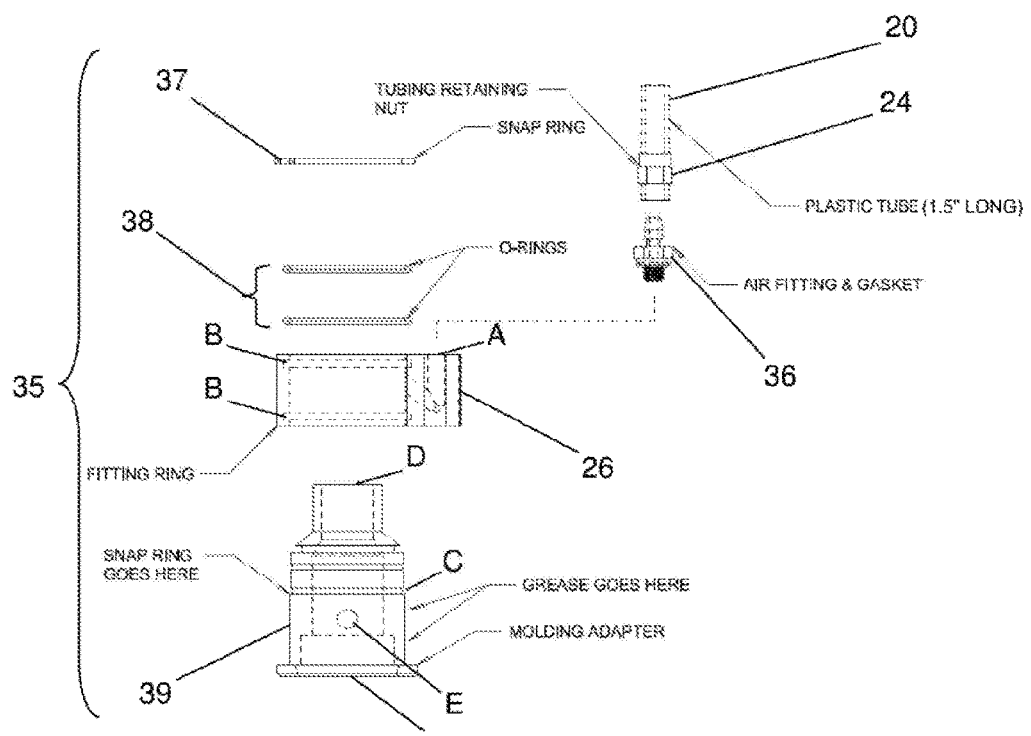
FIG. 4 illustrates an exploded schematic view of the embodiment of an inventive pressurized cable connector that is shown in FIGS. 2 and 3.

FIG. 4 illustrates an exploded schematic view of the embodiment of an inventive pressurized cable connector assembly 35 that is shown in FIGS. 2 and 3. Pressurized line 20 is joined to tube retaining nut 24, and air fitting and gasket 36 is inserted into the pressurized line 20 via the tube retaining nut 24. The air fitting and gasket 36 assembled to the pressurized line 20 is joined to the opening in collar 26 at point "A". Sealing o-rings 38 are placed into positions "B" and ensure that air entering point "A via the air fitting 36 will only exit via aperture "E" in molding adapter 39 into the to be attached connector 28. Snap ring 37 is positioned into groove "C" following the placement of the collar 26 around molding adapter 39 to keep the collar 26 from sliding off the molding adapter 39. During final assembly, the molding adapter 39 has a cable 12 inserted through the small end "D" and a connector 28 screwed into the large end "F" and the cable is assembled. After assembly, the rubber molding strain relief 34 is molded onto the back of the adapter (area "D"). Typically a 1½" length of tube similar to pressurized line 20 is installed so that the clamp ring won't get lost during shipping and is later replaced with the users tubing.

Figure 5:
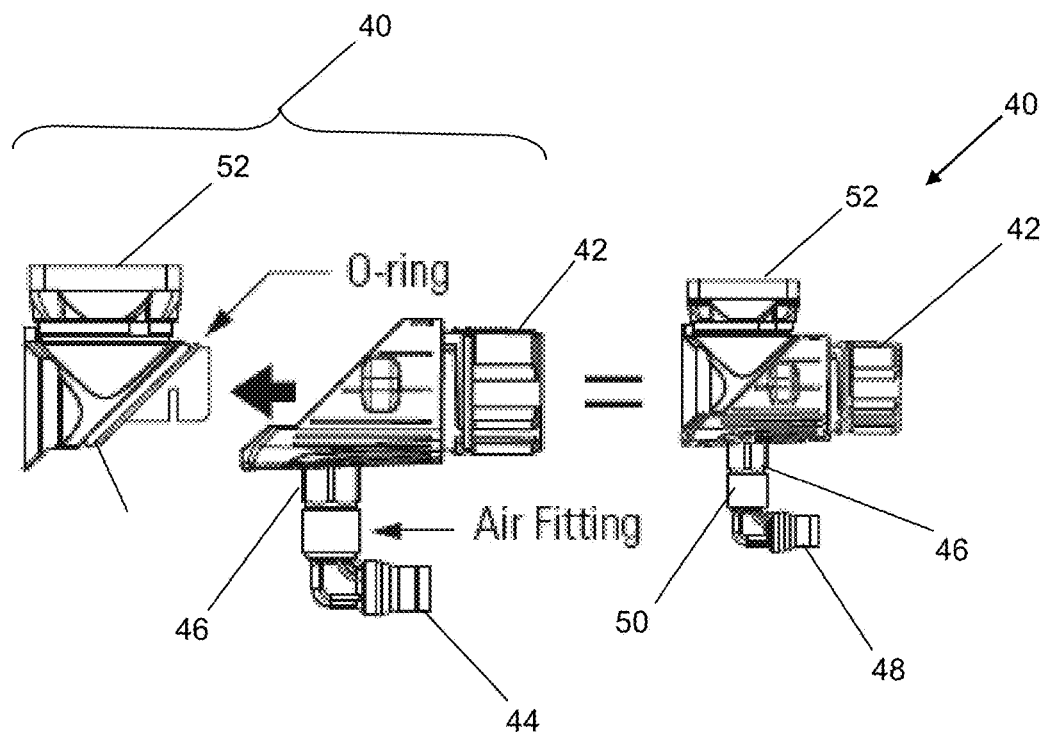
FIG. 5 illustrates an exploded schematic view of an embodiment of an inventive pressurized cable connector.

FIG. 5 illustrates an exploded schematic view of an embodiment of an inventive right angle pressurized cable connector 40. Right angle connector 40 has a first terminus 42 for joining to an electrical or signal supply cable (not shown), and a second terminus 52 for mounting to an electromechanical device (not shown). Positive pressure dry air or gases, or a negative pressure (vacuum) are supplied via air fitting 50. Air fitting 50 connects to a pressurized line (not shown) via connector 48, and to the body of right angle connector 40 via nut 46.

Figure 6:
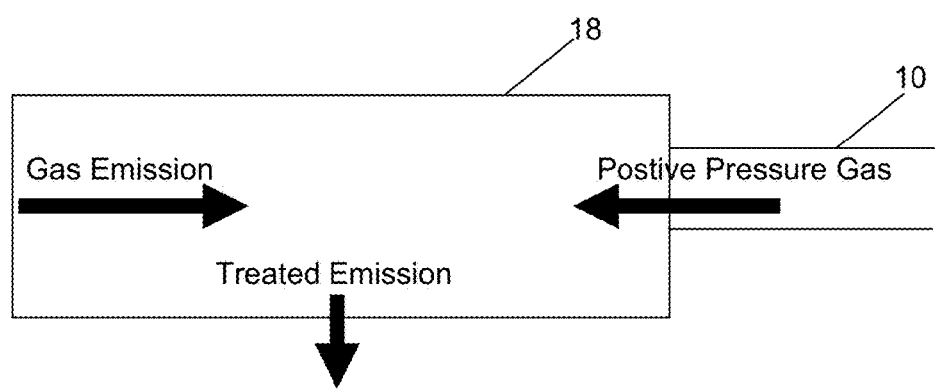
FIG. 6 illustrates a schematic view of an embodiment of the inventive pressurized cable supplying reactive gases for treating emissions from an electromechanical device.

FIG. 6 illustrates a schematic view of an embodiment of the inventive pressurized cable assembly 10 supplying reactive gases for treating emissions from an electromechanical device 18. Electromechanical devices are known to produce emissions that are harmful to the environment. For example, electric motors discharge ozone, or vehicles discharge nitric oxide or carbon monoxide that are damaging to the environment. By introducing a positive pressure gas into the electromechanical device, the positive pressure gas reacts with the emission gases, a treated emission that is more favorable or less damaging to the environment may be produced.

In operation, a gas or air is supplied by a compressor to an electromechanical device via a supply line. The supply line is joined or coupled to an electrical line or signal input cable or line that is joined to the electromechanical device using an existing or predesigned or standard electrical or signal input. For example, positive pressure dry air, nitrogen, or other gases may be introduced into the back of an encoder connector that provides signals for controlling a servo motor. It is appreciated that by selection of the gas entering the electromechanical device or motor according to the present invention, the amount of ozone produced by the device or motor is reduced or the reaction of the gas entering the motor can occur to perform desired chemistry. By way of example, carbon monoxide is reacted with air within an operating motor housing to produce carbon dioxide. The carbon monoxide source being for example, an exhaust stream from an internal combustion engine.

Since an existing connection is utilized for introducing air or gas to an electromechanical device or motor, no additional holes are required to be made in the motors case to introduce the positive pressure air or gases. The making of additional holes is labor intensive, expensive, and may compromise the performance of the electromechanical device. Furthermore, alterations to the original design of an electromechanical device may void the manufacturer's warranties covering the electromechanical device or motor.

Figure 7A:
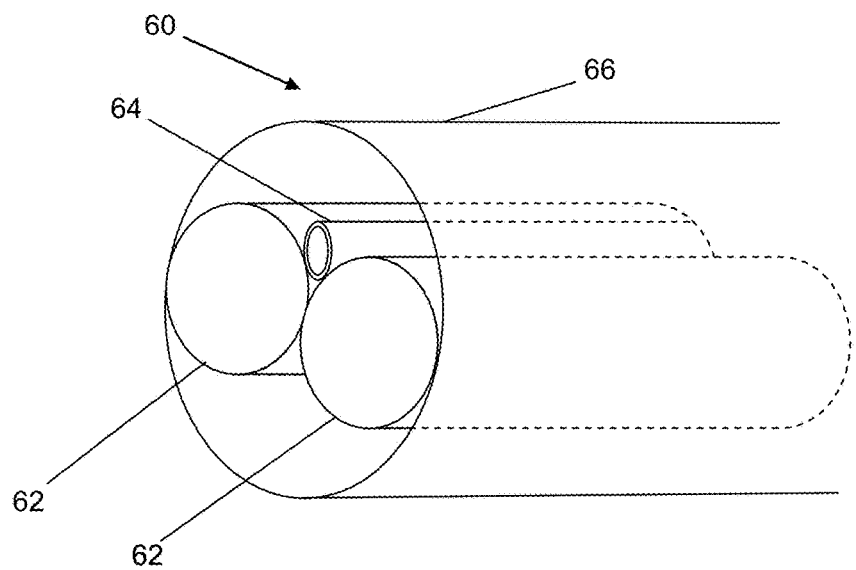
FIGS. 7A and 7B show alternative embodiments of pressurized cables with an air or gas channel integrated into or with a signal or power cable.
Figure 7B:
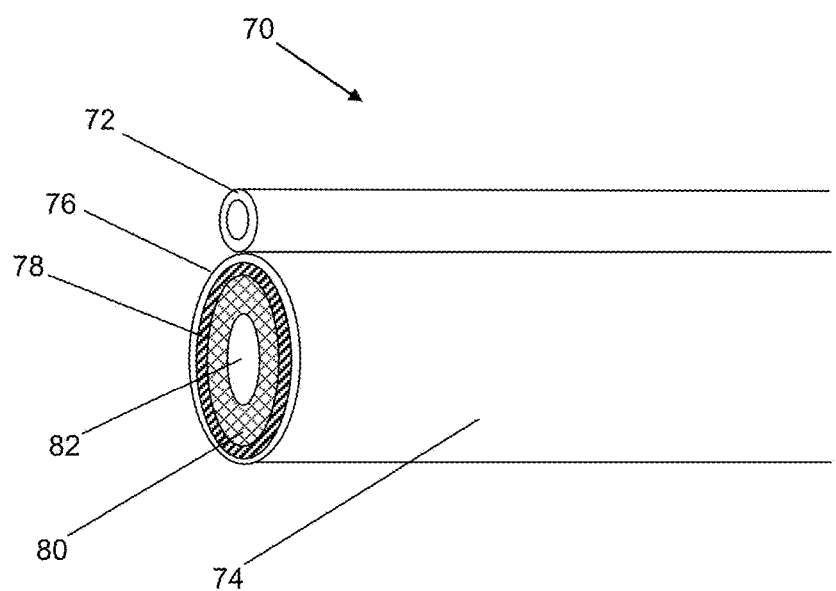

FIGS. 7A and 7B show alternative embodiments of pressurized cables with an air or gas channel integrated into or with a signal or power cable. FIG. 7A illustrates a cable or wire 60 with two conductors 62, such as a twisted pair or isolated wires for power transmission with an air or gas tube 64 within the insulating cover 66. FIG. 7B illustrates a coaxial cable 74 with an air or gas channel 72 molded directly to the outer cover 76. Coaxial (coax) cables and other signal carrying and frequency dependent cables typically have characteristic impedance which can not be altered with the introduction of an air or gas channel. In the example embodiment of FIG. 7B the coax 74 has an outer grounded shield 78 separated from conductor 82 by insulator 80. Cable 70 requires a connector (not shown) that combines the air or gas channel 72 and coax 74 without altering and/or matching the impedance of the cable.

For example, an encoder cable may internally contain a very small tube which would allow air/or gas to be introduced into the back of the connector without having to have an external air supply running all the way out to the motor. The air could be introduced into the cable in the control cabinet.

Figure 8:
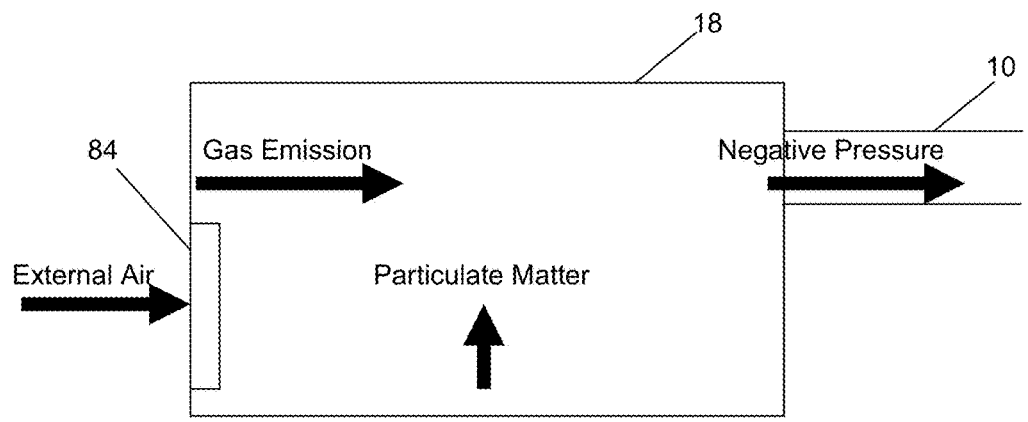
FIG. 8 illustrates a schematic view of an embodiment of the pressurized cable creating a vacuum in an electromechanical enclosure.

FIG. 8 illustrates a schematic view of an embodiment of the inventive pressurized cable assembly 10 providing a negative pressure or vacuum for stopping emissions and shavings from emerging from a electromechanical device 18. Electromechanical devices are known to produce emissions that are harmful to the environment, and in sterile or clean room environments particulates and emissions should be eliminated or minimized. For example, electric motors discharge ozone and other pollutants, or shavings from bearings and moving parts that degrade over time. In a clean room, particulate matter is avoided so that the particulates are not introduced into the product being manufactured. By introducing a negative pressure into the electromechanical device 18 via pressurized cable assembly 10 a vacuum is created in the device 18. The vacuum draws in external air through a filtered vent 84, and gas emissions and particulate matter are drawn out by the vacuum in the pressurized cable assembly 10. Thus instead of gas emissions and particulate matter potentially entering the sterile or clean room environment, the gas emissions may be treated outside the sterile or clean room environment and the particulate collected for proper disposal.

Figure 9:
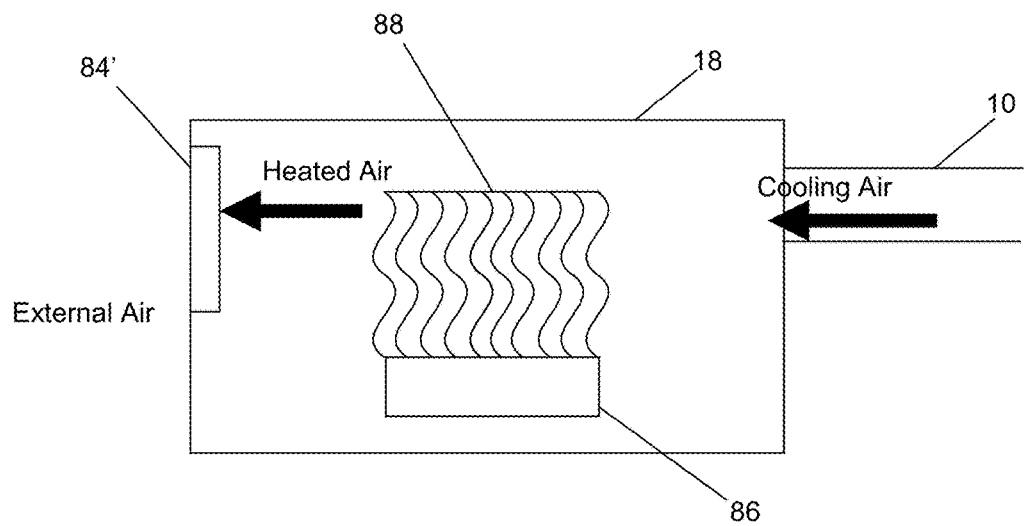
FIG. 9 illustrates a schematic view of an embodiment of the pressurized cable introducing cooling air into an electromechanical enclosure.

FIG. 9 illustrates a schematic view of an embodiment of the inventive pressurized cable assembly 10 providing a cooling air stream to an electromechanical device 18. Electromechanical devices are known to produce heat during operation. Heat may be generated by components that have high rotational speeds such as in a motor, or by speed of operation such as a microprocessor, memory, or storage device, or power outputted by an amplifier or power transistor. Introducing cooling air into the electromechanical device 18 via pressurized cable assembly 10 creates an airflow is in the device 18. The cooling airflow draws heat 88 away from a heat source 86 within electromechanical device 18 that exits through a filtered or unfiltered vent 84'. The inputted cooling airstream may be cooled by a chiller (not shown) or other cooling device, or the temperature of the ambient air may be used.

As a general rule electronics and electromechanical devices have a higher level of performance and an extended operating life when these devices are properly cooled. Thus for example, electromechanical device 18 may be a computer with a heat source 86 in the form of a microprocessor that is generating heat 86, and a power carrying cable in the form of pressurized cable assembly 10 that is supplying a cooling airflow. Alternatively, an amplifier (heat source 86) in a cellular repeater or base station (electromechanical device 18) may be cooled via a power or signal connector or backplane (pressurized cable assembly 10).

The foregoing description is illustrative of particular embodiments of the invention, but is not meant to be a limitation upon the practice thereof. The following claims, including all equivalents thereof, are intended to define the scope of the invention.

The invention claimed is:

1. A pressurized cable assembly comprising:
   an electrical or signal supply cable with a first end and a second end;
   a connector on said first end that has one of: a screw-on terminus, a snap-fit terminus, or a press-fit terminus complementary to an electromechanical device and adapted for mounting to said electromechanical device;
   a pressurized line with a proximal end and a distal end adapted to carry a gas flow or vacuum draw from the distal end;
   a collar surrounding said connector;
   an air fitting terminating at the proximal end of said pressurized line and adapted to be joined to an opening in said collar; and
   a plurality of seals positioned to ensure that the gas flow or vacuum draw entering said air fitting only exits into said connector.

2. The pressurized cable assembly of claim 1 wherein said collar has a channel for said dry air or one or more gasses in fluid communication with a cavity in said electrical or signal supply cable.

3. The pressurized cable assembly of claim 1 wherein said collar is proximal to said first end.

4. The pressurized cable assembly of claim 1 wherein said collar is positioned between a length of said first end and said second end.

5. The pressurized cable assembly of claim 1 wherein said electrical or signal supply cable has a cross-section comprising of one of circular, rectangular, square, or oval.

6. The pressurized cable assembly of claim 1 wherein said electrical or signal supply cable is formed of materials including rubber, plastics, woven materials, and combinations thereof.

7. The pressurized cable assembly of claim 1 wherein said electrical or signal supply cable acts as an electrical shield for enclosed wires and conductors.

8. The pressurized cable assembly of claim 1 wherein said collar is formed from metal, alloy, rubber, plastic, or other composite materials.

9. The pressurized cable assembly of claim 1 wherein said pressurized line has a cross-section comprising of one of circular, rectangular, square, or oval.

10. The pressurized cable assembly of claim 1 said pressurized line is made of rubber, plastic, or other materials.

11. The pressurized cable assembly of claim 1 wherein said pressurized line is clear or opaque.

12. The pressurized cable assembly of claim 1 wherein said collar is integrated or joined to said connector via a strain relief of said electrical or signal supply cable.

13. The pressurized cable assembly of claim 1 wherein said collar is an overmolding.

14. A method of making a pressurized cable assembly, the method comprising:
- joining an electrical or signal supply cable with a pressurized line with a collar surrounding a connector;
- wherein said electrical or signal supply cable has a first end and a second end;
- wherein said pressurized line has a proximal end and a distal end adapted to carry a gas flow or vacuum draw from the distal end;
- wherein said connector has one of: a screw-on terminus, a snap-fit terminus, or a press-fit terminus complementary to on said first end of an electromechanical device and adapted for mounting said electrical or signal supply line to said electromechanical device;
- wherein an air fitting terminating at the proximal end of said pressurized line is adapted to be joined to an opening in said collar; and
- wherein a plurality of seals are positioned to ensure that the gas flow or vacuum draw entering said air fitting only exists into said connector.

15. The method of claim 14 wherein said collar has a channel for said dry air or one or more gasses in fluid communication with a cavity in said electrical or signal supply cable.

16. The method of claim 14 wherein said collar is positioned proximal to said first end or is positioned between a length of said first end and said second end.

17. The method of claim 14 wherein said electrical or signal supply cable has a cross-section comprising of one of circular, rectangular, square, or oval; and
- wherein said supply line cable is formed of materials including rubber, plastics, woven materials, and combinations thereof.

18. The method of claim 14 wherein said collar is formed from metal, alloy, rubber, plastic, or other composite materials.

19. A method for treating emissions from an electromechanical device, the method comprising:
- providing the pressurized cable assembly of claim 1;
- connecting the pressurized cable to said electromechanical device;
- providing one or more reactive gases via said pressurized assembly to react with said emissions from said electromechanical device.

20. The method of claim 14 wherein said collar is an overmolding.

* * * * *